United States Patent [19]

Dishal

[11] 3,955,144

[45] May 4, 1976

[54] FEEDBACK SYSTEM FOR PULSE TRANSMITTERS

[75] Inventor: Milton Dishal, Upper Montclair, N.J.

[73] Assignee: International Telephone and Telegraph Corporation, Nutley, N.J.

[22] Filed: Oct. 17, 1974

[21] Appl. No.: 515,788

[52] U.S. Cl. ............................. 325/159; 325/178; 325/179; 325/187
[51] Int. Cl.² ......................................... H04B 1/04
[58] Field of Search .................. 325/159, 184, 187; 343/103

[56] References Cited
UNITED STATES PATENTS

| 3,141,134 | 7/1964 | Osborne et al. | 325/159 |
| 3,204,194 | 8/1965 | Steel et al. | 325/159 |
| 3,486,128 | 12/1969 | Lohrmann | 325/159 |

FOREIGN PATENTS OR APPLICATIONS

| 421,013 | 12/1934 | United Kingdom | 325/159 |
| 494,613 | 3/1929 | Germany | 325/159 |

*Primary Examiner*—Albert J. Mayer
*Attorney, Agent, or Firm*—John T. O'Halloran; Menotti J. Lombardi, Jr.; Vincent Ingrassia

[57] ABSTRACT

This relates to an apparatus for obtaining a specific antenna current or voltage waveshape at an antenna. A reference network, which includes a low level lumped element model of the antenna and the transmitter output network, produces drive signals when impulsed. The first of these signals corresponds to a voltage having the desired antenna current waveshape. The second is a voltage having a waveshape which must be produced across the input terminals of the transmitter output network in order that the specified antenna current be produced. The third signal is a voltage which has a waveshape equivalent to the waveshape of a current which must be injected into the input terminals of the transmitter output network in order that the specified waveshape be produced. At least one of these signals is used to drive the transmitter.

12 Claims, 14 Drawing Figures

FEEDBACK SYSTEM FOR PULSE TRANSMITTERS

BACKGROUND OF THE INVENTION

This invention relates to an apparatus for obtaining a specified load current or voltage wave characteristic in a resonant load, and more particularly, to an arrangement wherein the bandwidth of the resonant load is narrow compared to the Forrier spectrum of said specified wave characteristic.

It is known generally that feedback may be used to aid in the production of a specified current or voltage waveshape. It is further well known that if enough loop gain can be used, the resulting voltage or current can be made to duplicate in shape a reference voltage to any specified degree of accuracy. However, due to the frequency selectivity of the internal networks of a power generator (e.g. transmitter) and the frequency selectivity of the output network between the power generator and the narrow band load (e.g. antenna), the amount of loop gain which can be employed before the overall system breaks into oscillation is severely limited. However, when the loop gain is small, so as to prevent oscillation, then the antenna current waveshape cannot be made to duplicate a reference network waveshape.

SUMMARY OF THE INVENTION

It is an object of the present invention to provide an apparatus for producing an exactly specified load waveshape with respect to a waveshape generated by a reference network without the use of excessive loop gain.

It is a further object of the present invention that a pre-distorted signal be applied to the power stage of the transmitter which will produce the exactly specified antenna current waveshape.

According to a broad aspect of the invention, there is provided an apparatus for obtaining a specified antenna current or voltage waveshape comprising: an antenna; a transmitter; an output network for coupling said transmitter to said antenna; means for simulating a first voltage having the desired antenna current waveshape, a second voltage having a waveshape equivalent to the waveshape of a voltage which must be produced across the input terminals of said output network in order that said spcified antenna current waveshape be produced, and a third voltage which has a waveshape equivalent to the waveshape of a current which must be injected into the input terminals of said output network in order that said specified waveshape be produced; and means for driving said transmitter with at least one of said first, second or third voltages.

The above and other objects of the present invention will be more clearly understood from the following detailed description taken in conjunction with the accompanying drawings in which:

DESCRIPTION OF THE PREFERRED EMBODIMENT

Figure 1:
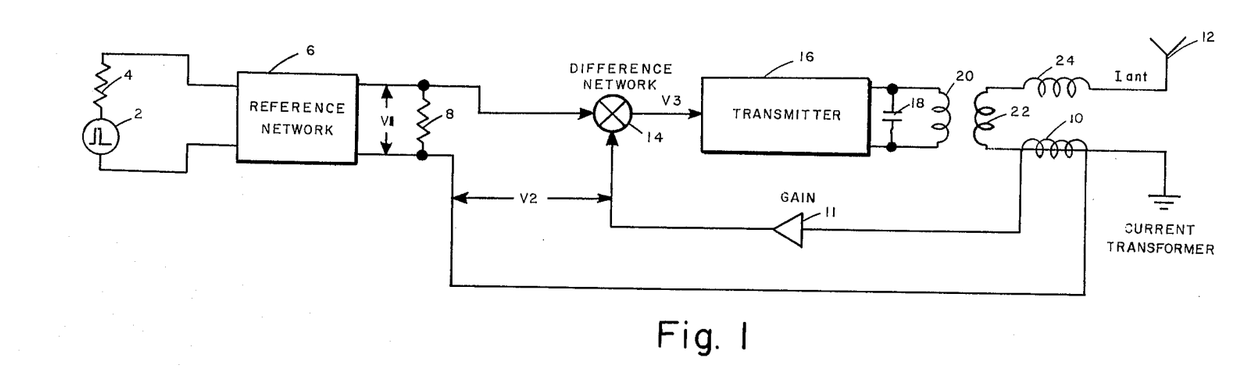
FIG. 1 illustrates a prior art arrangement for obtaining an antenna current having a desired waveshape.

FIG. 1 illustrates a known arrangement for obtaining an antenna current of a desired waveshape using the standard feedback technique. An impulse generator source 2 coupled in series with source resistance 4 supplies an impulse signal (in the order of 0.05 microsecond) to a reference network 6. The reference network 6 is designed to produce an output voltage ($V_1$) across resistor 8 of exactly the waveshape desired for the antenna current ($I_{ant}$). A current transformer 10 at antenna 12 samples the antenna current and produces a voltage ($V_2$) which has a waveshape substantially equivalent to that of the actual antenna current. The difference between voltages $V_1$ and $V_2$ is determined in a standard difference network 14 which generates an output voltage ($V_3$) which is used to drive transmitter 16. Also shown in FIG. 1 is a typical output network comprising capacitor 18 and coils 20, 22 and 24. In this case, the output network is a typical 2-pole band-pass filter.

As stated previously, due to the frequency selectivity of the internal transmitter network and the output network coupled between transmitter 16 and antenna 12, the amount of loop gain which may be employed to obtain a specified antenna current waveshape is limited by that amount of loop gain which will cause the overall system to break into oscillations.

In order to facilitate an understanding of the invention, it is deemed necessary to include in this description the steps necessary to arrive at the inventive arrangement. First, the reactance and resistance characteristics of the antenna to be used must be determined, and the desired antenna current waveshape must be specified. Second, through analysis and modeling, an appropriate output network for coupling the transmitter and the antenna is chosen, as will be explained more fully below. It is only necessary that the chosen output network contain one less pole than the specified load current waveshape. A typical output network is shown in FIG. 1 and comprises capacitor 18 and coils 20, 22 and 24.

Next, it is necessary to produce a low level lumped element model of the antenna to be used. Also, the chosen output network must be modeled to the same scale factor as the antenna model. It should be clear that since the models have identical frequency responses, the waveshapes of the currents and voltages in the low level model will be substantially identical to those in the high level actual output circuit and antenna. Further, the low level output network will have the same configuration as the actual output network. This, combined with the antenna simulation will form a part of the overall reference network. The remainder of the reference network is then synthesized such that when the overall network is impulsed, the resulting current waveshape $I_a$ through the simulated antenna correspond exactly to the current waveshape $I_{ant}$, which is desired to appear at the actual antenna.

Figure 2:
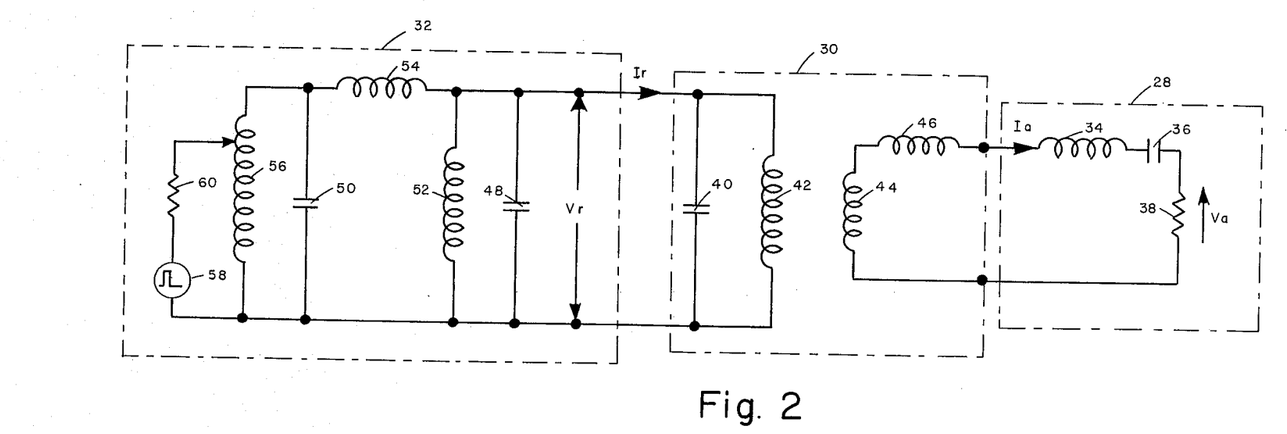
FIG. 2 shows a synthesized reference circuit for a three-pole antenna according to the invention.

FIG. 2 shows a correctly synthesized reference network configuration for a 3-pole antenna current waveshape having an envelope shape described by the equation $i = i_p e^2 (t/t_p)^2 e - (2 t/t_p)$ where $t_p$ is the time taken for the waveshape envelope to reach its peak value, and $i_p$ is this peak value. Referring to FIG. 2, box 28 represents the antenna simulation comprising coil 34, capacitor 36 and resistor 38. Box 30, containing capacitor 40, coils 42, 44 and 46, represents the output network model. Box 32, containing capacitors 48 and 50, coils 52, 54 and 56 and impulse generator 58 with its associated resistance 60, forms the remainder of the reference network.

Figure 3A:
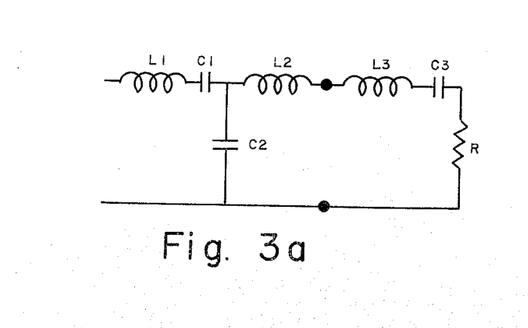
FIGS. 3a, b and c illustrate various transmitter output networks in conjunction with both series and parallel type resonant loads.
Figure 3B:
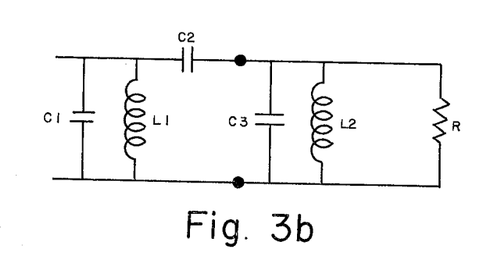
Figure 3C:
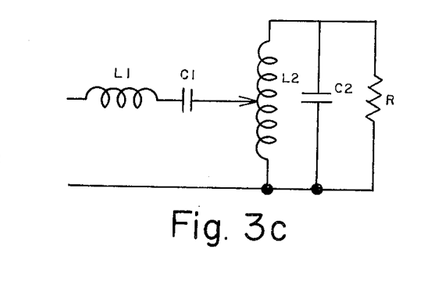

For the sake of completeness, it should be noted that the antenna simulation shown in block 28 of FIG. 2 is for a series resonant type of load; for example, a Marconi type antenna. The output network simulation shown in block 30 is that which results when it is required that the output network be a parallel resonant circuit. FIG. 3a illustrates the situation when a series resonant output network is required with a series resonant type load. Further, FIGS. 3b and 3c illustrate the two possible output network simulations when the load is a parallel resonant load; for example, a loop type antenna. It should be noted that each of the above examples correspond to 2-pole arrangements. It is deemed unnecessary to discuss the extensions of these principles with respect to N pole arrangements as these techniques are well known to the skilled practitioner. It should finally be noted that any of the well known methods of coupling resonators can be employed.

Comparing FIGS. 1 and 2, FIG. 1 yields a single output, which is an output voltage $V_1$ having the desired antenna current wave form. However, the arrangement in FIG. 2 yields three outputs. The first is also an output voltage $V_a$ having the desired antenna current. A second is a voltage $V_r$ having exactly the waveshape of the voltage which must be produced across the input terminals of the transmitter output network. The third output is a voltage which is produced by means of a current transformer sampling the current $I_r$. This produced voltage has exactly the waveshape of the current which must be injected into the input terminals of the transmitter output network. It is the availability and proper use of these three outputs which is the heart of the inventive arrangement.

Figure 4:
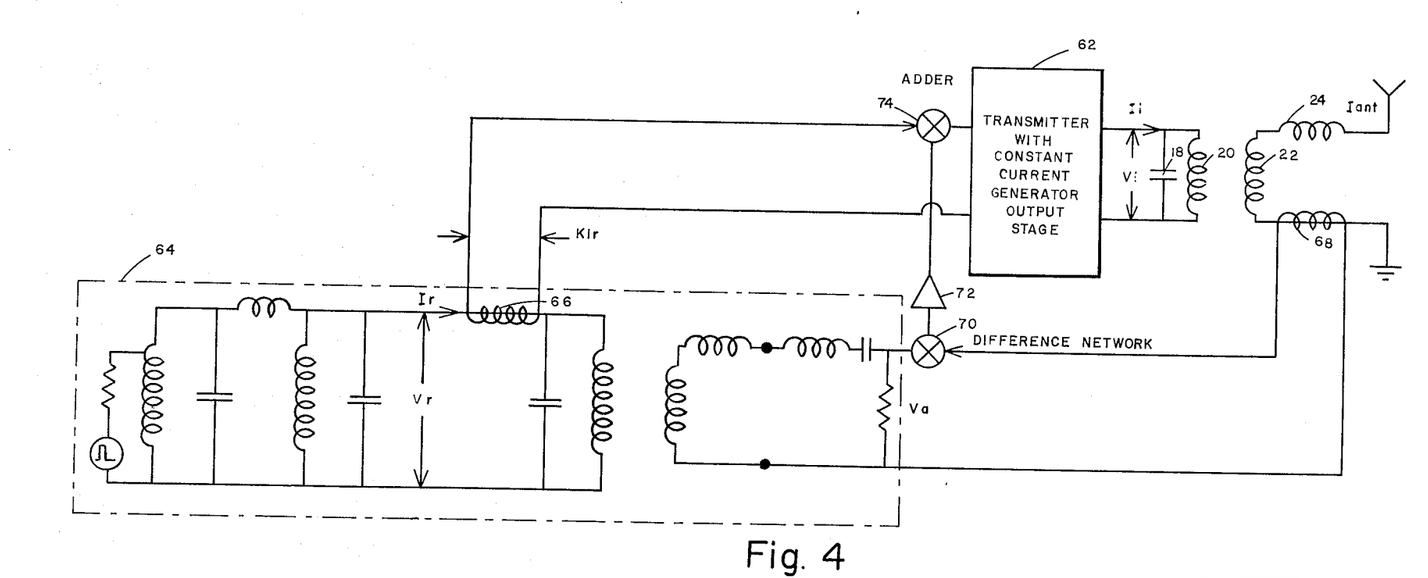
FIG. 4 illustrates the inventive concept when used in conjunction with a transmitter having a constant current generator output stage.
Figure 5:
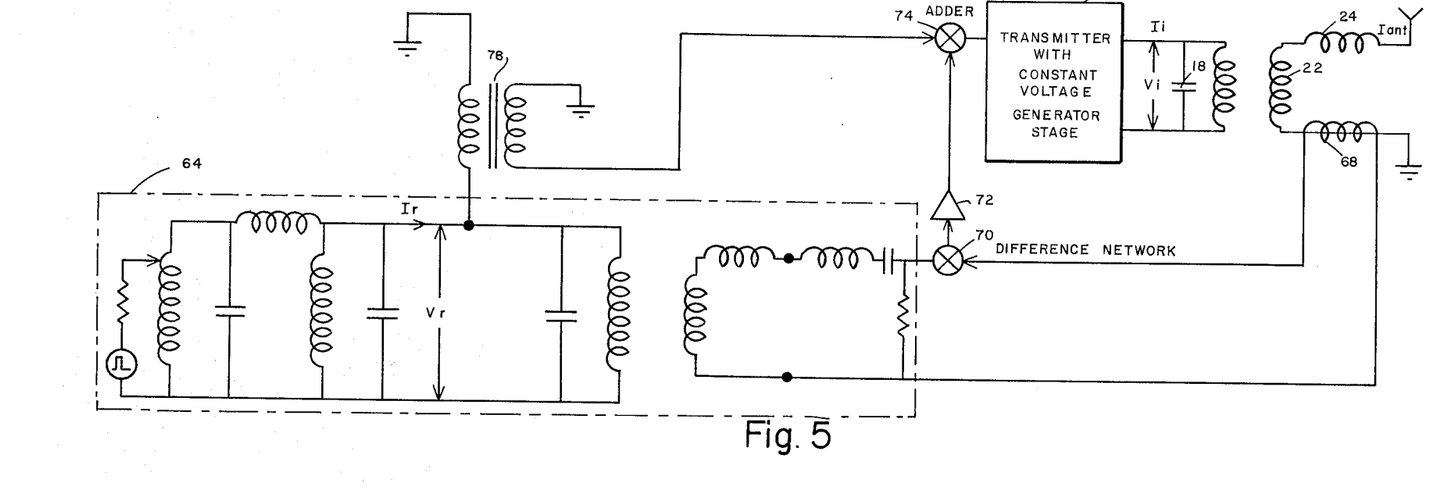
FIG. 5 illustrates the inventive concept when used in conjunction with a transmitter having a constant voltage generator output stage.
Figure 6:
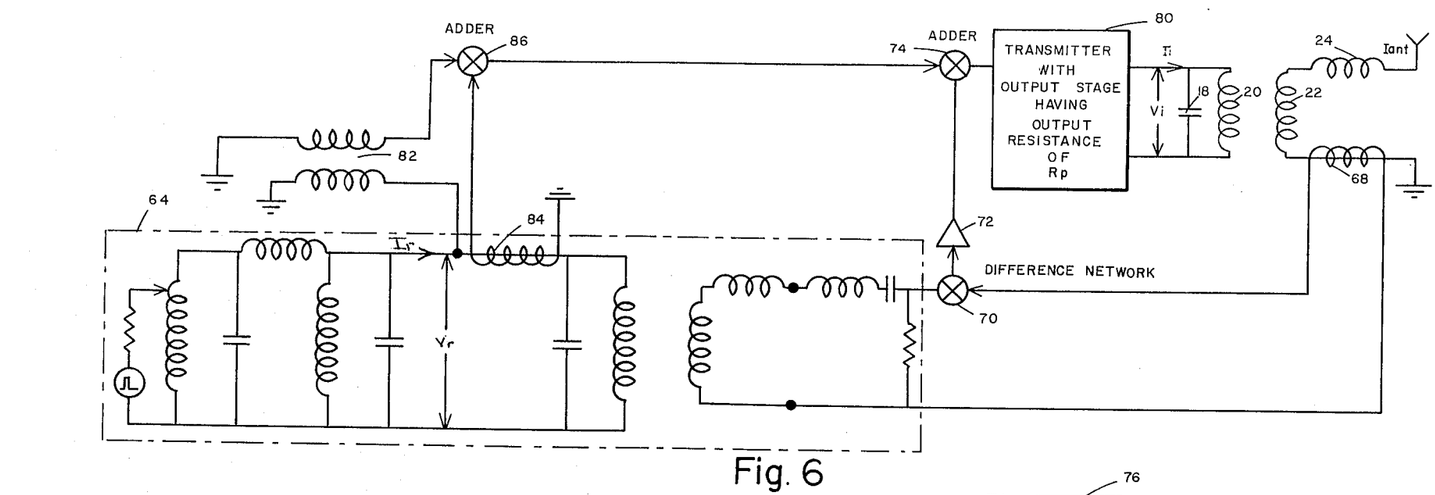
FIG. 6 illustrates the inventive concept when used in conjunction with a transmitter having an output stage with an output resistance $R_p$.

The use of the above described concept will be described for the sake of clarity and simplicity in conjunction with (1) the case where the output stage of the transmitter is essentially a constant current generator (FIG. 4); (2) the case where the output stage of the transmitter is essentially a constant voltage generator (FIG. 5); and (3) the general case wherein the output stage of the transmitter has an equivalent output resistance $R_p$ (FIG. 6). The arrangement in FIG. 4 contains a transmitter 62 having a constant current generator output stage. Box 64 contains the reference network shown in FIG. 3. Like elements have been denoted by like reference numbers. It can be seen that the third available output. i.e:, a voltage generated by current transformer 66, is coupled to the transmitter power stage via adder 74. Obviously, the current transformer must be chosen so that its output reactance is sufficiently large as compared with the load to be fed.

If transmitter 62 were perfectly linear and the simulation of the antenna and the transmitter output network part of the overall reference network were completely equal, nothing further would be required to produce an antenna current in the actual antenna which would have the proper specified waveshape. This is so because the waveshape of $I_r$ is the waveshape which the output stage must inject into the output network. However, because the transmitter is not perfectly linear, nor the antenna and output network simulations perfectly proportioned, use is made of the third available output voltage $V_a$ from the reference network. As shown, this voltage and the actual antenna current wave form, via current transformer 68, is applied to difference network 70. The difference output, after amplification in amplifier 72, is added to the output of current transformer 66 in adder network 74. The sum is then applied to transmitter 62. In this way, correction has been made for transmitter non-linearities and model imperfections. It is important to note that for a specified accuracy in antenna current, the amount of feedback (loop gain) required using the arrangement in FIG. 4 is very much less than that required using the prior art arrangement according to FIG. 1; i.e., using the arrangement in FIG. 4, the current wave form shape in the antenna is almost perfect with no feedback whatsoever; whereas the arrangement in FIG. 1 will determine an antenna current waveshape which is extremely incorrect without the use of feedback. Referring to FIG. 5, there is shown a similar arrangement with the exception that the transmitter 76 has a constant voltage generator output stage and that instead of employing the third available output, the second available output $V_r$, via voltage transformer 78, is coupled to the transmitter power stage via adder 74. It should be clear that a standard voltage divider may replace voltage transformer 78, however, care must be taken to insure that the resistance of the voltage divider is high enough so that the operation of the reference network will not be disturbed. The voltage $V_r$ possesses the exact waveshape which the output stage of the transmitter must produce across the output network.

FIG. 6 shows an arrangement containing a transmitter 80 having an output stage resistance of $R_p$. This, in effect, embodies the two previous situations, i.e., constant current when $R_p$ equals infinity, and constant voltage when $R_p$ equals zero. As can be seen, both the second and third available outputs from reference network 64 are coupled to the transmitter power stage via adders 86 and 74. By means of voltage transformer 82 and current transformer 84, voltages are produced having values of $NV_r$ and $KI_r$ respectively. These voltages are combined in adder network 86 and the sum applied to adder network 74. These two outputs, however, must be combined in the proper proportion to obtain the correct transmitter drive voltage. This can be accomplished as follows:

Current transformer 84 has a transfer constant of K volts per ampere, e.g. 0.5 volt/amp.; then voltage transformer 82 must have an equivalent turns ratio N where N equals $K/R_p$. Thus, if the current transformer constant was 0.5 volt/amp and the power output stage had an output resistance of 220 ohms, then the equivalent turns ratio of the voltage transformer would be N = $K/R_p$ = 0.5/220 = 1/440 volts/volt.

Figure 7:
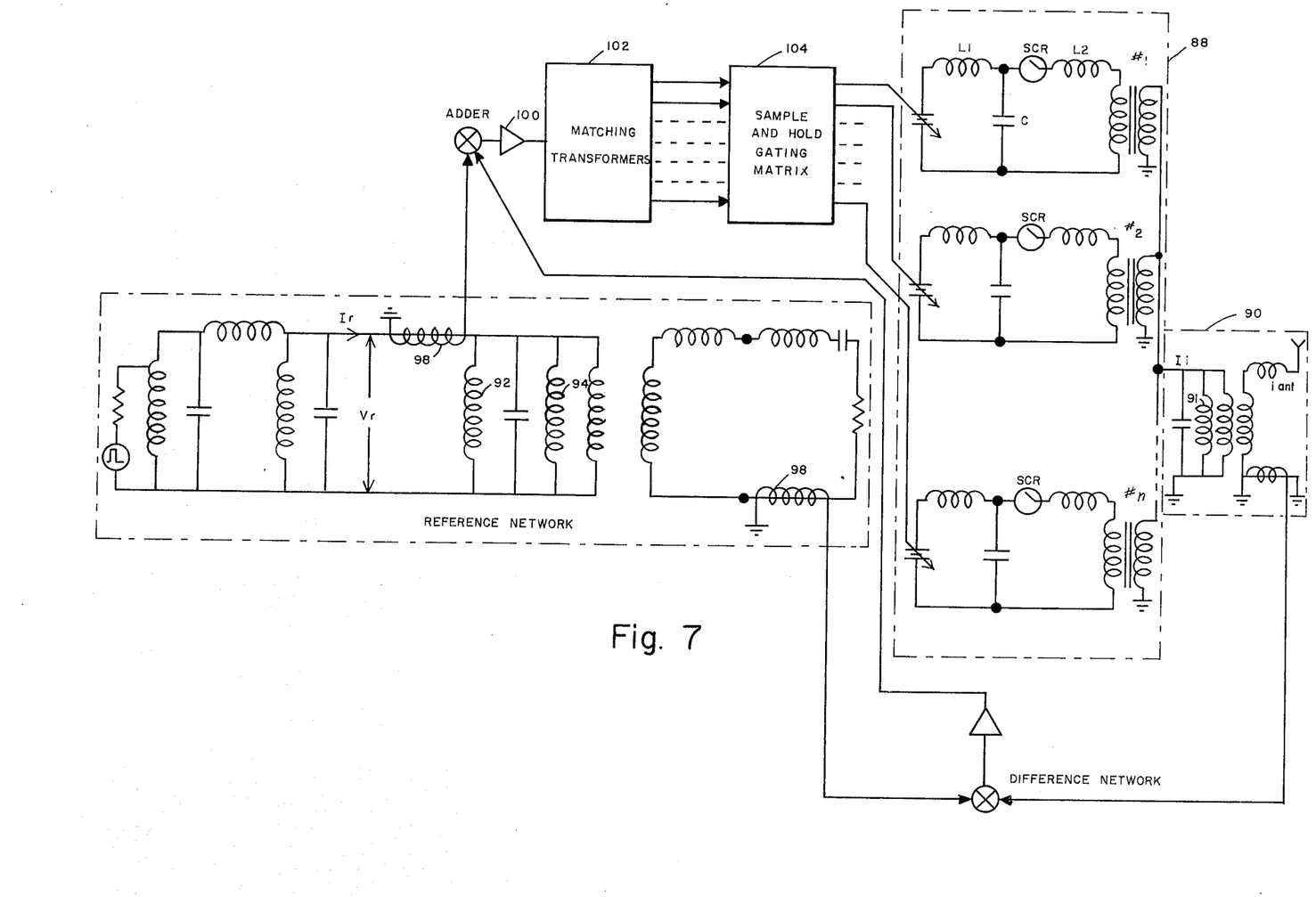
FIG. 7 illustrates the use of the inventive means for obtaining a specified antenna current waveshape in conjunction with a half cycle generator pulse transmitter.

FIG. 7 illustrates the use of the above described means for obtaining a specified antenna current waveshape in conjunction with a half cycle generator pulse transmitter employing silicon controlled rectifiers (SCR) half cycle generators. This is especially applicable to a solid state Loran transmitter which uses a different pulse generator for each half cycle of the leading edge of Loran pulse, and properly combines these half cycles by tying together the output leads of the pulse transformers associated with each half cycle generator. Each of the half cycle generators shown in transmitter block 88 comprises a source of d.c. voltage, coils L1 and L2, capacitor C, a silicon controlled rectifier, and a half cycle generator output transformer. It should be noted that the resultant open circuit output inductance of the paralleled pulse generator transformers provides a significant part of the total inductive susceptance required at the input node of the output network 90. As a result, the transmitter current $I_1$, corresponding to the reference network current $I_r$, does not exist on a single lead but instead, on the input lead of each half cycle generator transformer. The transformed magnitude depends on the turns ratio for the particular half cycle generator involved. FIG. 7 illustrates that the transmitter current $I_1'$ corresponds in the reference network to the current $I_r'$ and not to the current $I_r$. Therefore, it can be seen that in order to make the above described reference network compatible with the half cycle generator pulse transmitter, it is only necessary to add inductor 92. It can be seen that an additional coil has also been added to both the reference network and the output network (94 and 96 respectively); however, it should be clear that this is just one alternative coupling procedure, many of which are available depending upon various design criteria.

The voltage output produced by $I_r$ of the reference network, via current transformer 98, is added to the difference signal as previously described with respect to FIG. 4. The sum is then applied through amplifier 100 to a series of transformers 102 having exactly the same equivalent turns ratio as each corresponding half cycle generator transformer in the transmitter. Since a half cycle generator pulse transmitter operates on a sequential basis, it is necessary that means be provided for storing and routing the control voltages to each half cycle pulse generator. For this purpose, a standard sample and hold gating matrix 104 can be employed. In this way, the current from each half cycle generator in the transmitter will have been adjusted in an open loop manner to have an amplitude such that if the transmitter output network has been properly proportioned and properly tuned, the specified antenna waveshape ($I_{ant}$) will result.

As stated with respect to FIG. 4, inaccuracies in proportion and tuning will result and therefore, the difference between the antenna current of the transmitter and the antenna current of the reference network is measured. After proper amplification, the difference signal is added to the open loop $I_r$ output of the reference network. It should again be clear that with perfect network proportioning and tuning, there would be no output from the difference network and therefore zero gain would be required in the feedback loop. A small amount of feedback loop gain is required only to correct for circuit imperfections.

In one form of Loran transmitter, the transmitter drive up to the peak of the pulse (FIG. 8a) is obtained from 14 consecutively triggered hand adjustable half cycle generators. By monitoring the antenna envelope shape and by using an iterative adjustment process, the antenna current leading edge can be made to have the desired $x2_e - 2x$ shape to a high degree of accuracy. However, after the 14 cycles of drive are stopped, the antenna current will not, of itself, decay in the desired slow manner shown in FIG. 8a, which will produce an acceptable pulse spectrum. Instead, the antenna current will, in general, decay as shown in FIGS. 8b and 8c; the shape being a function of the plate resistance of the output stage which is maintained during the pulse decay period and the Q of the antenna mesh of the network.

Figure 8A:
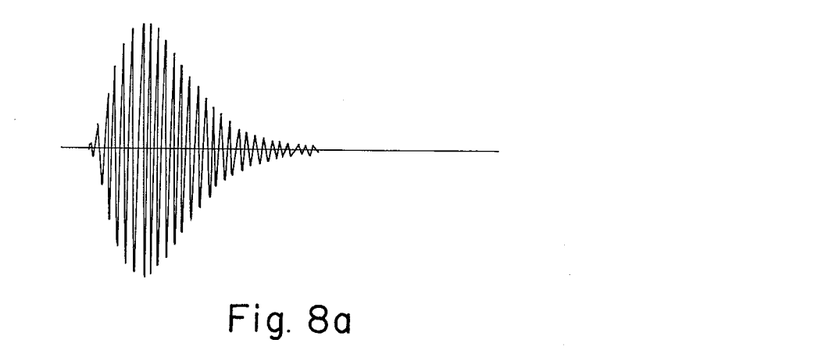
FIGS. 8a, b and c are curves corresponding to both acceptable and unacceptable Loran type pulses.
Figure 8B:
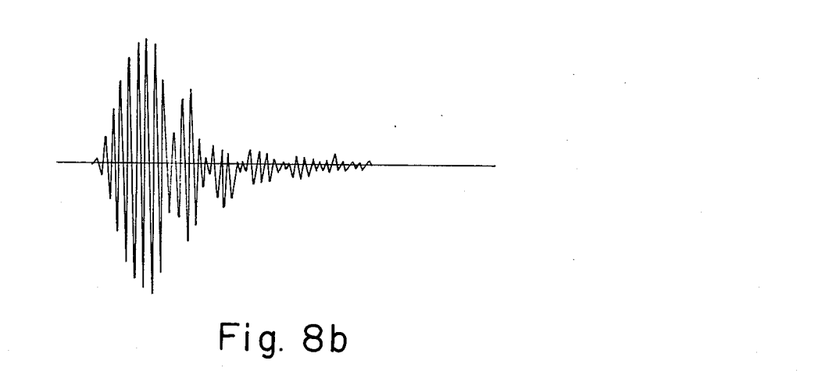
Figure 8C:
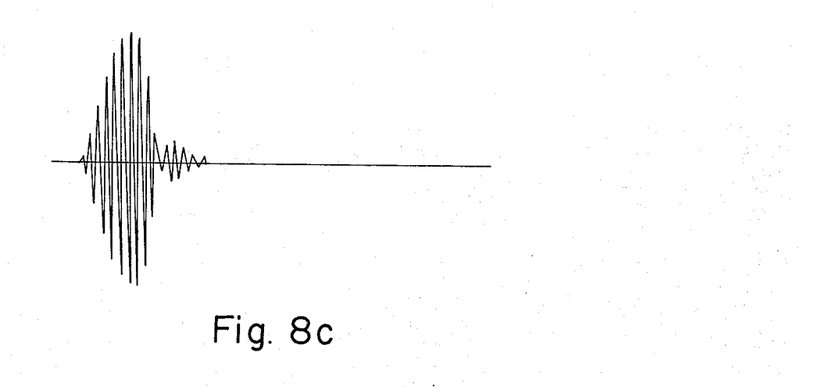

An examination of FIG. 8a will show that there are more than 50 half cycles of appreciable level in the desired slow pulse tail. To generate these desired tail half cycles with individual half cycle generators would require an undesirable amount of equipment and an unreasonable lengthy adjustment procedure. By employing the reference network according to the invention and gating its properly proportioned output into the transmitter drive at the end of the 14th half cycle, the proper drive for all the half cycles in the desired slow (good spectrum) tail is automatically supplied with a very small amount of equipment and a negligible amount of adjustment.

Figure 9:
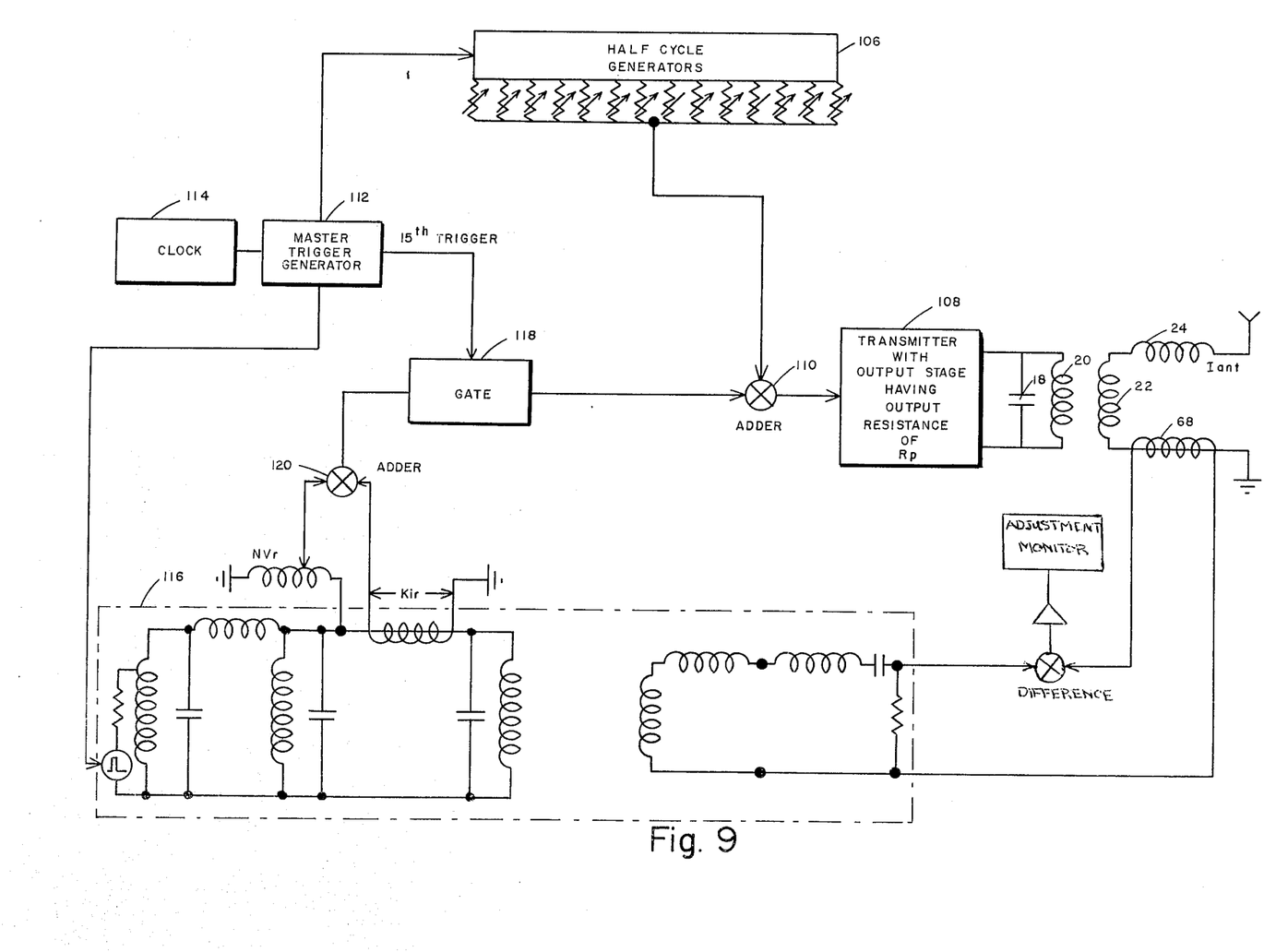
FIG. 9 illustrates the use of the inventive concept in conjunction with a specific arrangement of manually adjustable half cycle generators.

Referring to FIG. 9, 14 half cycle generators 106 manually adjustable by variable resistors, are coupled to transmitter 108 via adder 110. A master trigger generator 112, controlled by a digital clock 114, generates trigger pulses every five microseconds. A trigger essentially coincident with the first of these triggers also impulses reference network 116, as was the case in the previous embodiments. Fourteen consecutive triggers turn on the 14 half cycle generators and, as stated, the first 14 adjustable half cycles of drive are applied to adder 110. During this time, gate 118 is closed, thereby rendering the output of reference network 116 ineffective. The 15th trigger, however, causes gate 118 to open, thereby allowing the reference network to supply the proper drive via adder 120, gate 118 and adder 110 to transmitter 108.

Figure 10:
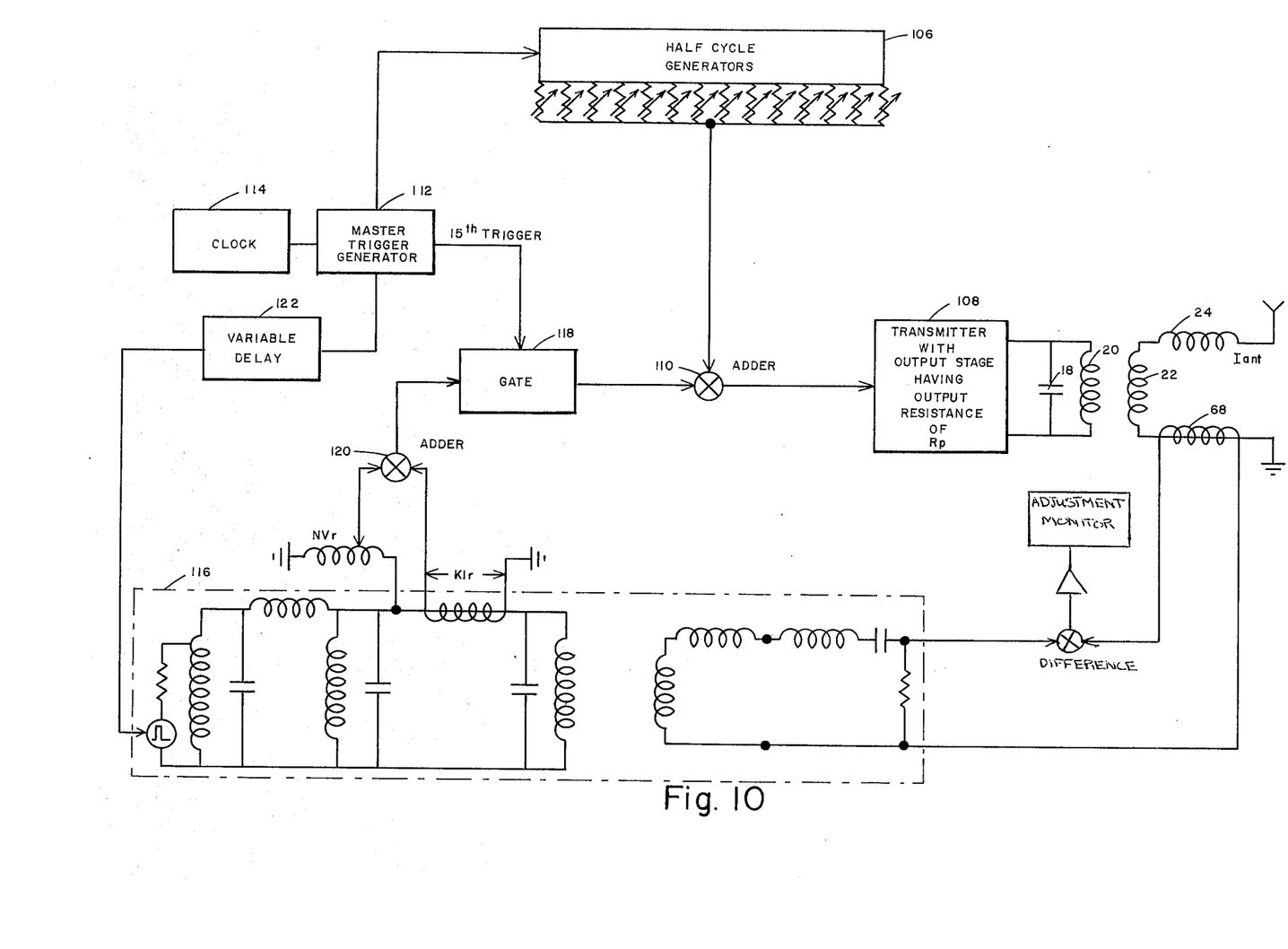
FIG. 10 shows the embodiment of FIG. 9, having added thereto means for variably delaying the impulse trigger to the inventive reference network in order to produce polyphase modulation on the Loran pulse.

Polyphase communication capability can be added to the Loran C system by transmitting, in each Loran pulse during the pulse decay period, a different RF phase relative to a navigation sampling point. This desired change in pulse decay phase can be straightforwardly accomplished by making two additions to the arrangement shown in FIG. 9. The modified arrangement is shown in FIG. 10. A variable delay circuit 122 is coupled between master trigger generator 112 and the reference network 116 for advancing or retarding the impulse trigger to the reference network. The amount of advance or retard is controlled by a communication code generator, such as the Communication Modulation Pulse Generator manufactured by Hartman Systems, Huntington Station, New York.

While the principles of the invention have been described above in connection with specific apparatus, it is to be clearly understood that this description is made only by way of example and not as a limitation on the scope of the invention.

What is claimed is:

1. An apparatus for obtaining a specified antenna current or voltage waveshape comprising:
   an antenna;
   a transmitter;
   an output network for coupling said transmitter to said antenna;
   means for simulating a first voltage having the desired antenna current waveshape, a second voltage having a waveshape equivalent to the waveshape of a voltage which must be produced across the input terminals of said output network in order that said specified antenna current waveshape be produced, and a third voltage which has a waveshape equivalent to the waveshape of a current which must be injected into the input terminals of said output network in order that said specified waveshape be produced; and
   means coupled between said simulating means and said transmitter for driving said transmitter with at least one of said first, second or third voltages.

2. An apparatus according to claim 1 wherein said transmitter has a constant current generator output stage and said third voltage is employed to drive said transmitter.

3. An apparatus according to claim 1 wherein said transmitter has a constant voltage generator output stage and said second voltage is employed to drive said transmitter.

4. An apparatus according to claim 1 wherein said transmitter has an output stage having an output resistance of $R_p$ and said second and third voltages are combined according to a predetermined ratio to drive said transmitter.

5. An apparatus according to claim 1 wherein said means for simulating is a reference network comprising:
   a low level lumped element model of said antenna;
   a model of said output network;
   means for receiving impulses; and
   circuit means coupled to said output network model and to said antenna model and to said means for receiving such that when impulsed, the resulting current waveshape through said antenna model will correspond to said specified waveshape.

6. An apparatus according to claim 1 further including means for comparing the actual antenna current wave form with said first voltage for adjusting the drive of said transmitter to correct for transmitter nonlinearities and model imperfections.

7. An apparatus according to claim 6 wherein said comparing means comprises:
   a difference network having first and second inputs and an output, said first input coupled to said first voltage;
   a current transformer coupled to said antenna and to said difference network whereby the actual antenna current waveshape may be compared with the simulated antenna waveshape;
   an amplifier having an input coupled to the output of said difference network; and
   adder means for combining said drive signal with the amplified difference signal.

8. An apparatus according to claim 1 wherein said antenna represents a series resonant load.

9. An apparatus according to claim 1 wherein said antenna represents a parallel resonant load.

10. An apparatus according to claim 1 wherein said transmitter is a half cycle generator pulse transmitter comprising a plurality of silicon controlled rectifier half cycle generators, said apparatus further including means for storing and routing said drive signal to each of said half cycle pulse generators.

11. An apparatus according to claim 1 wherein said transmitter comprises:
   fourteen manually adjustable half cycle generators having outputs coupled to a transmitter output stage, said half cycle generators providing drive signals for a first predetermined number of cycles in said specified waveshape;
   means for triggering said half cycle generators and said reference network;
   gate means coupled to said second and third outputs for isolating said reference network from said transmitter output stage during said first predetermined number of cycles and for coupling said reference network to said transmitter output stage to provide drive signals for the remaining number of cycles in said specified waveshape.

12. An apparatus according to claim 11 further including means for variably delaying the trigger to said reference network in order to produce polyphase modulation on said specified wave form.

* * * * *